(No Model.)

N. J. TUBBS.
HYDRAULIC ENGINE.

No. 314,276. Patented Mar. 24, 1885.

6 Sheets—Sheet 1.

Witnesses.
Thomas J. Bewley.
Joseph P. Ingram

Inventor
Nelson J. Tubbs.
per Stephen Ustick, atty (No Model.)  N. J. TUBBS.  6 Sheets—Sheet 2.
HYDRAULIC ENGINE.
No. 314,276.  Patented Mar. 24, 1885.

Witnesses.
Thomas J. Bewley.
Joseph P. Ingram.

Inventor.
Nelson J. Tubbs.
per Stephen Ustick att'y (No Model.) 6 Sheets—Sheet 4.

N. J. TUBBS.
HYDRAULIC ENGINE.

No. 314,276. Patented Mar. 24, 1885.

Witnesses.
Thomas J. Bewley.
Joseph P. Ingram.

Inventor.
Nelson J. Tubbs.
per Stephen Ustick
Att'y (No Model.) 6 Sheets—Sheet 5.
N. J. TUBBS.
HYDRAULIC ENGINE.
No. 314,276. Patented Mar. 24, 1885.
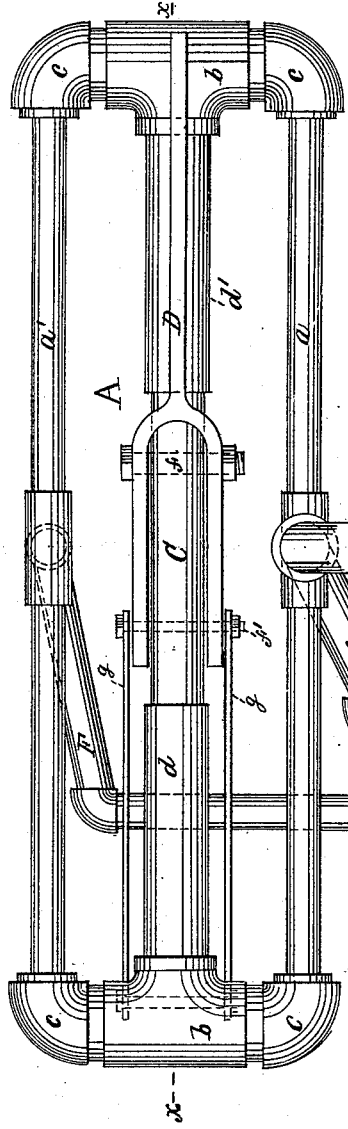
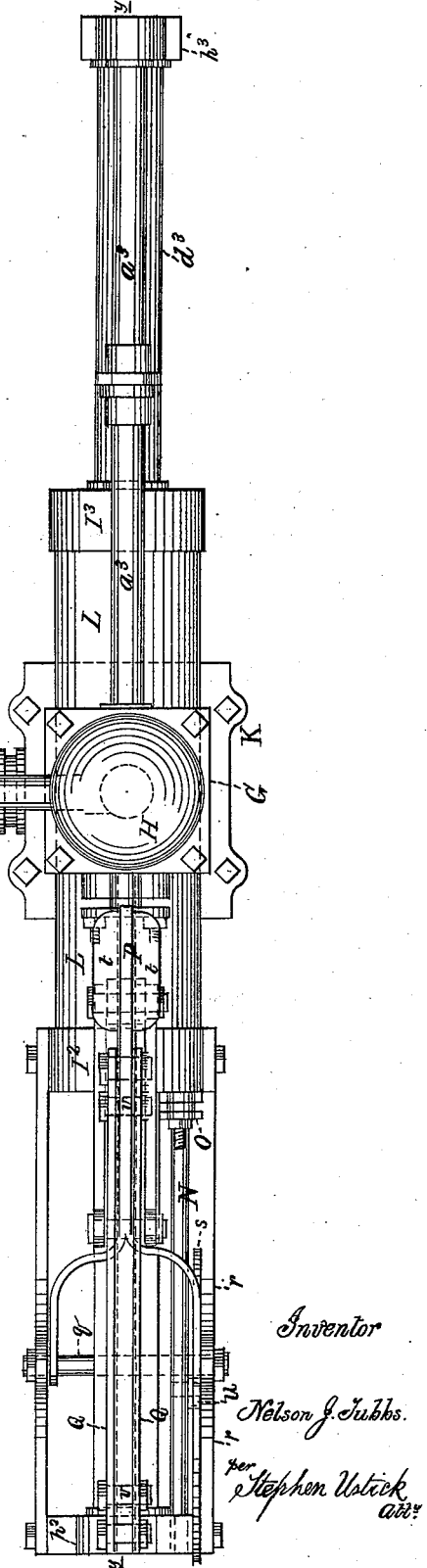
FIG 5
Witnesses.
Thomas J. Bewley.
Joseph P. Ingram.
Inventor
Nelson J. Tubbs.
per Stephen Ustick
att'y

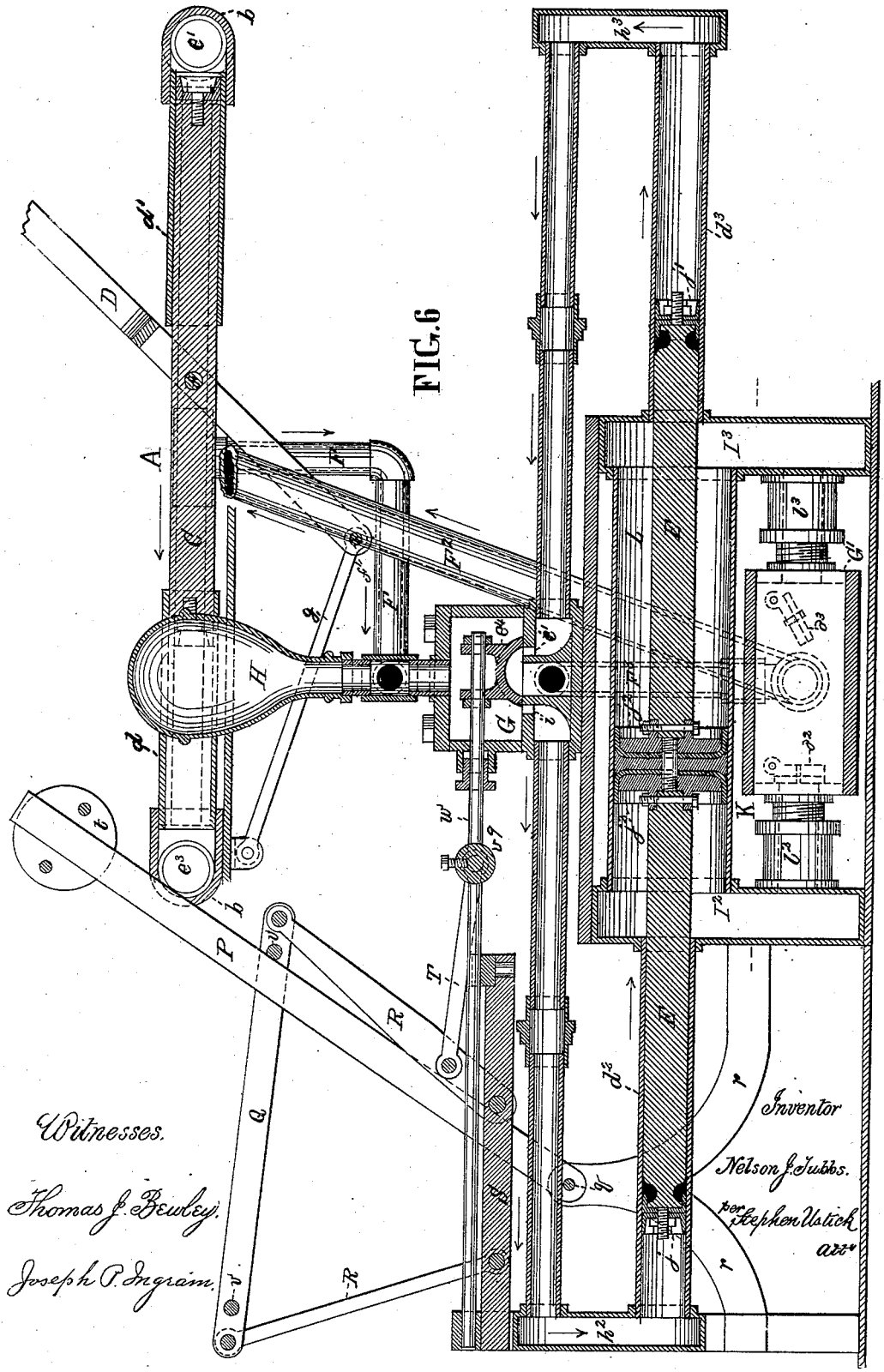

UNITED STATES PATENT OFFICE.

NELSON J. TUBBS, OF PHILADELPHIA, PENNSYLVANIA.

HYDRAULIC ENGINE.

SPECIFICATION forming part of Letters Patent No. 314,276, dated March 24, 1885.

Application filed July 20, 1883. (No model.)

*To all whom it may concern:*

Be it known that I, NELSON J. TUBBS, a citizen of the United States, residing at Philadelphia, in the county of Philadelphia and State of Pennsylvania, have invented a new and useful Improvement in Hydraulic Engines, of which the following is a specification.

My present invention relates to certain improvements in hydraulic motors, and the mechanism connected and operating therewith, whereby a column of water or other fluid maintained in circulation by a prime motor or pump is caused to operate a second hydraulic motor located at a distance from the prime motor, said second motor serving to actuate a pump or other mechanism; and my invention consists in the several novel arrangements and combinations of parts, as hereinafter more fully described, and pointed out in the claims.

Figure 1:
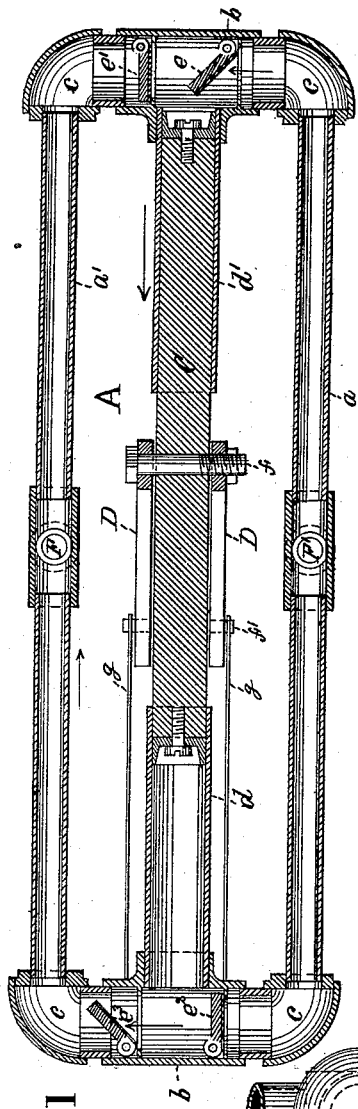
Figure 7:
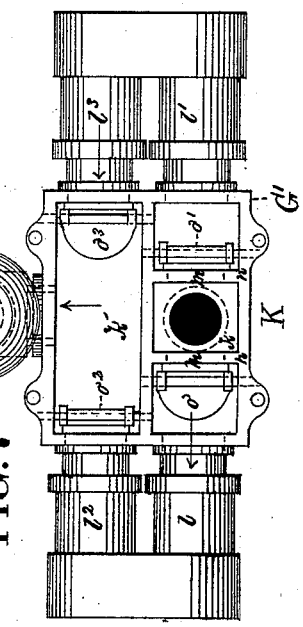
Figure 2:
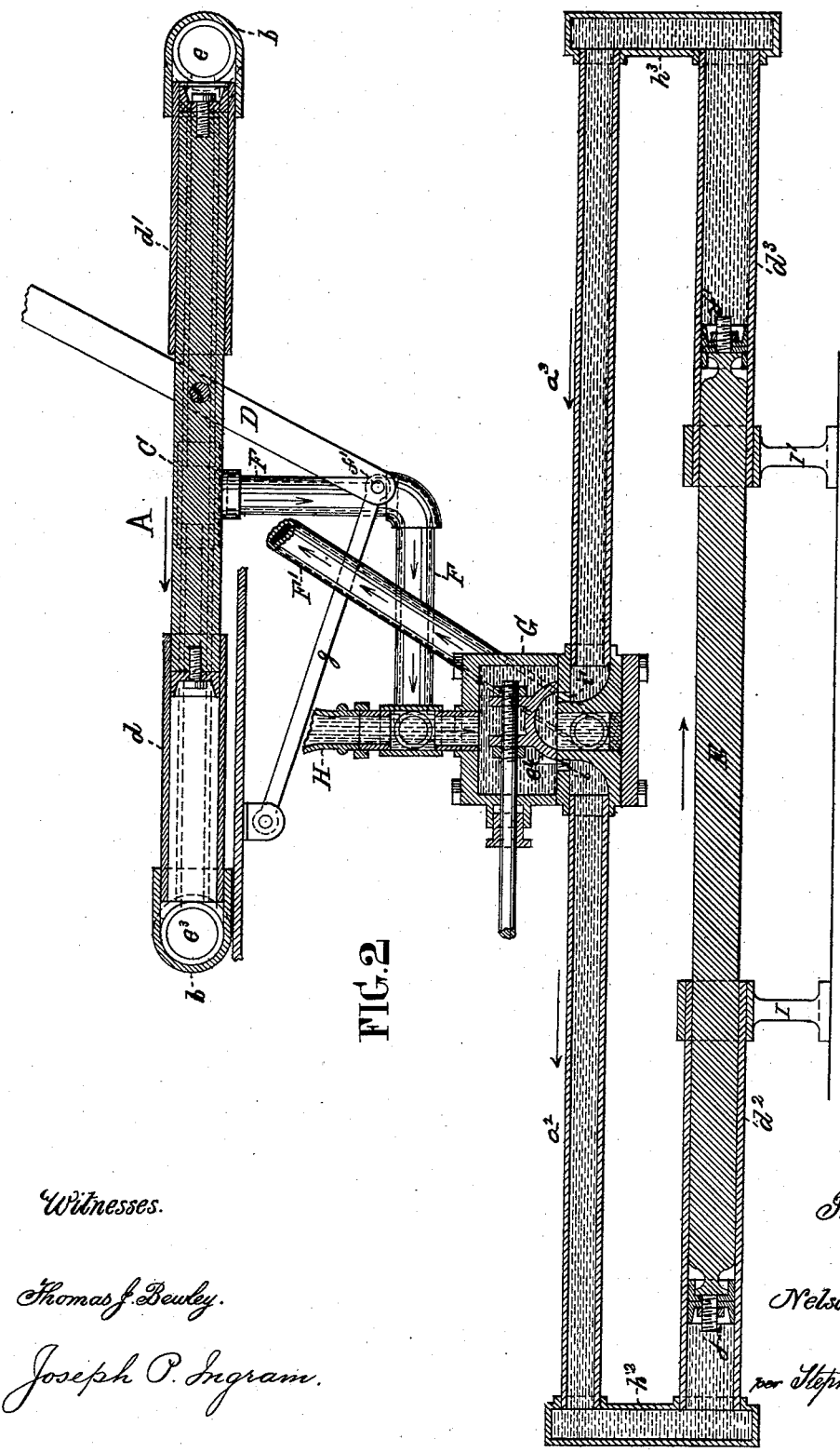
Figure 3:
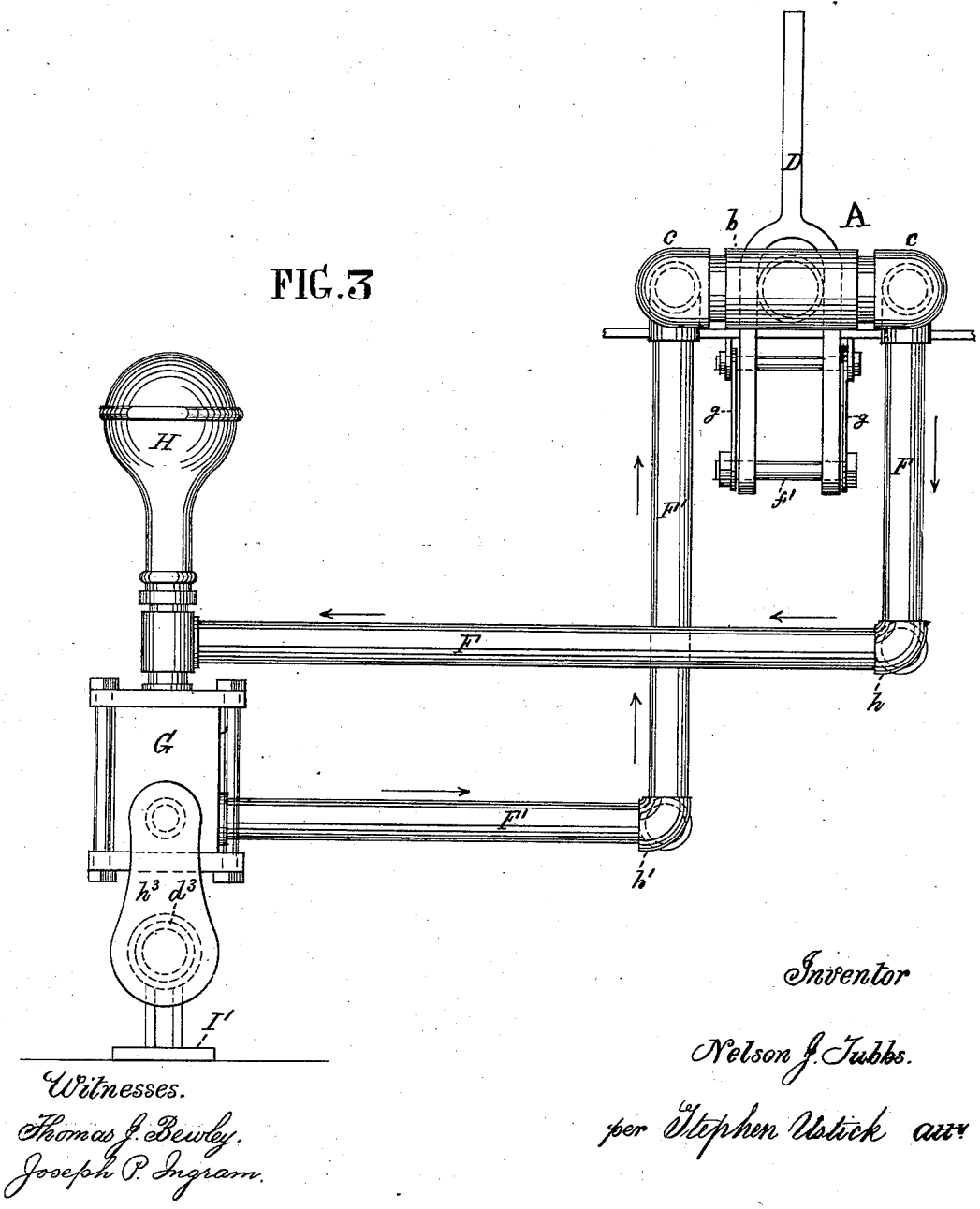
Figure 4:
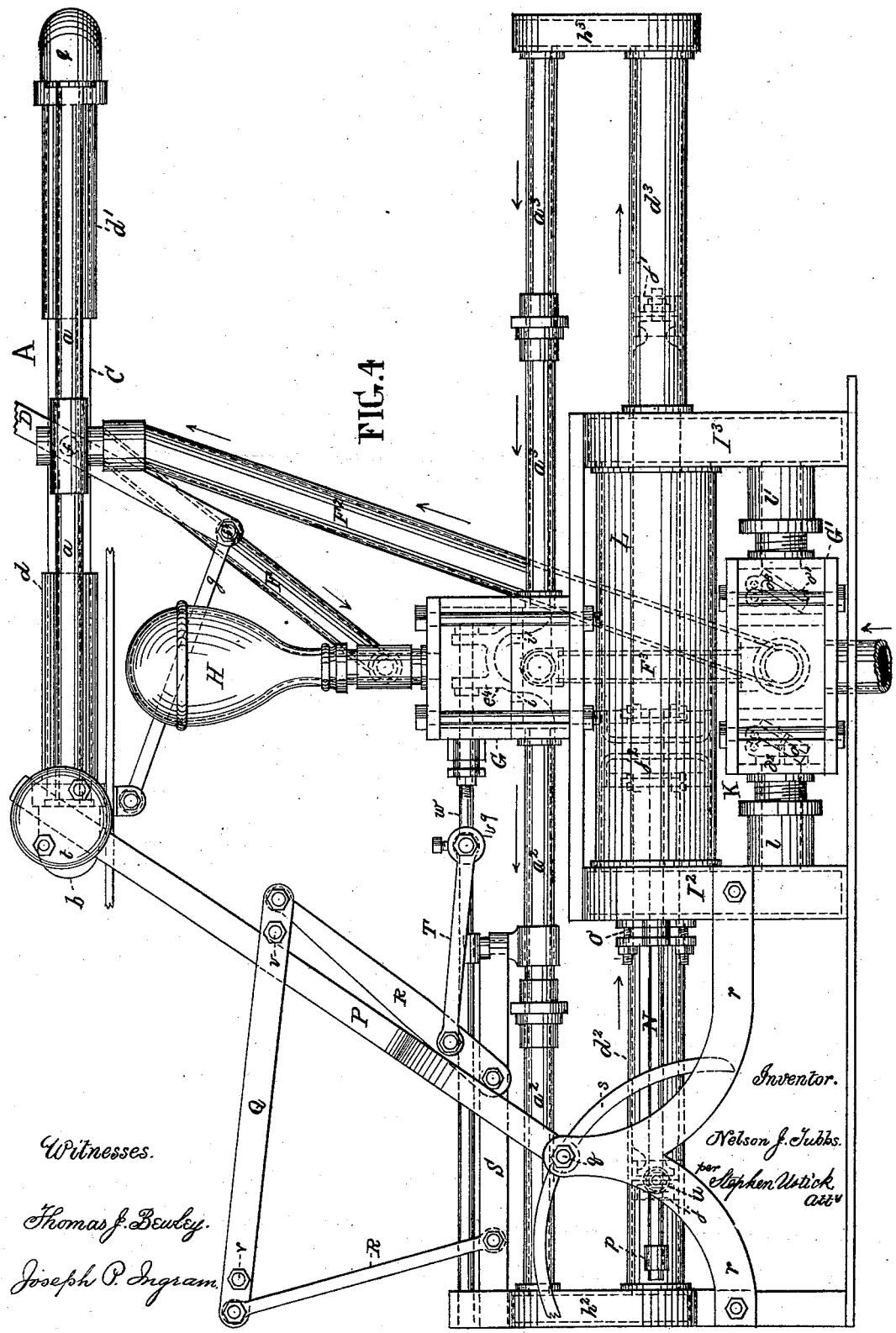

In the accompanying drawings, Figure 1 is a longitudinal section of a force-pump suitable for the prime motor. Fig. 2 is a longitudinal section of the prime and secondary motors; Figs. 3 and 4, end and side views, respectively, of the entire mechanism, including the prime and secondary motors and the pump driven by the latter. Fig. 5 is a plan view of the apparatus. Fig. 6 is a longitudinal section through the prime and secondary motors and pump. Fig. 7 is a detail showing the construction of the valve-chest of the pump.

The double-acting force-pump A, which, as constructed, furnishes an acceptable prime motor, is composed of the two hollow end pieces or heads, $b\ b$, each containing an inlet-valve, $e\ e^2$, and an outlet-valve, $e'\ e^3$, the oppositely-disposed cylinders, $d\ d'$, attached one to each head $b$, and between the inlet and outlet valves, and the delivery and supply pipes $a\ a'$, attached by couplings $c$ to the heads $b$. The heads $b$ and pipes $a\ a'$ form a rectangular hollow frame, within which project the cylinders $d\ d'$, and the piston-rod C, working in both of said cylinders, is connected to a lever, D, fulcrumed in the links $g\ g$, attached to the frame. The induction-pipe F′, through which the liquid is drawn by the movement to and fro of the piston, is connected to the pipe $a$, while the delivery-pipe F communicates with the pipe $a'$, into which the liquid is forced by the pistons.

Further description of the construction and operation of this part of the apparatus is deemed unnecessary, as the action is common to pumps of this variety, and will be readily understood by any one skilled in the art, the only function performed by the prime motor being to force the water or other liquid into and through the pipe F; hence, as is obvious, other forms of pumps or hydraulic motors might be employed in this position. The power of the prime motor is transmitted to the secondary motor through the medium of the column of water or other liquid thus produced and maintained within the pipe F by the action of the pump A.

The secondary motor shown, adapted to drive either a pump or other mechanism, is constructed essentially as follows: A piston-rod, E, constituting the medium for applying the power of the motor, and from whence the mechanism to be operated, derives its motion, is provided at either end with a piston, $j\ j'$, working in cylinders $d^2\ d^3$. Both of said cylinders communicate through pipes or hollow heads $h^2\ h^3$ with pipes $a^2\ a^3$, connected to opposite sides of the valve-chamber G, in which works the slide-valve $e^4$. The valve $e^4$ is an ordinary slide-valve and co-operates with the ports $i\ i$, communicating with the pipes $a^2\ a^3$, an eduction or discharge port being formed intermediate the ports $i\ i$, as shown. The water or other liquid under pressure is conveyed through the pipe F to the valve-chamber G, and in order to regulate the pressure an air-chamber, H, is located at some convenient point in the length of the pipe F, but preferably at the delivery end and above the valve-chamber G, as indicated in the drawings. As will be readily understood, the water or other liquid under pressure as delivered from the pipe F is by the valve $e^4$ caused to act alternately upon the pistons $j\ j'$, the waste or exhaust being discharged through the eduction-port, and thus a reciprocating motion is imparted to the piston-rod E.

The necessary movements of the valve $e^4$ to direct and control the admission of the fluid to the operating-cylinders are effected in the following manner: To the valve-rod $w'$ is adjustably secured a block, $v^3$, provided with trunnions or pivots, to which are attached the links T. The opposite ends of these links T are attached to one of two sets of reversely-inclined pivoted links or arms, R, whose upper ends are connected together by the links Q. Working on a pivot, $q$, in the frame $r$ is a lever, P, carrying on its upper or free end an adjustable weight, $t$. The lever P stands, preferably, between the links Q, being guided thereby and permitted to vibrate longitudinally thereof between the stops $v$, located at or near the ends of said links. The lower end of the lever P is provided with a segmental yoke or fork, $s$, and a roller, $u$, carried by a rod, N, attached to and reciprocating with the piston-rod E, works between and alternately makes contact with the arms of the fork $s$.

Hydraulic engines or motors, unlike those driven by an elastic fluid, require a positive and almost instantaneous movement of the controlling-valve, for the reason, among others, that as soon as the supply is cut off from one side of the piston the further movement of the latter is at once arrested until the pressure is transferred to the other side, whereas with steam, air, or other compressible fluids it continues to act by expansion, even after the valve is closed; hence, in order to produce a practically continuous movement of the motor, it is essential that the valve shall cut off the supply from one cylinder, open the exhaust from that cylinder, and open the port at the opposite end of the cylinder simultaneously and quickly.

The mechanism described is found in practice well adapted to control the movements of the valve in the manner indicated.

Referring more particularly to Figs. 4 and 6, it will be observed that the weighted lever P, inclining to the right and bearing upon the stop $v$, holds the links R, and through the latter the valve $e^4$, to the right. In this position the water or other fluid is admitted to the left-hand cylinder $d^2$ and the exhaust-port opened to the cylinder $d^3$, thus causing the piston-rod $e$ to move to the right. As the piston-rod approaches the limit of its movement to the right the roller $u$ makes contact with the right-hand arm of the fork $s$, and gradually raises the lever P until the weighted end passes the center upon which the lever is pivoted, whereupon, being no longer supported, the lever falls suddenly to the left, and, striking the stop $v$ on that side, causes a rapid movement of the links R to the left, and with them the valve $e^4$. This movement of the valve $e^4$ opens the exhaust from the cylinder $d^2$ and the supply to the cylinder $d^3$, and the operations are thus repeated so long as a sufficient pressure of liquid is maintained in the supply-pipe F.

The arrangement shown of links R and Q is not only efficient for operating, in connection with the lever P, the valve $e^4$, but serves also to insure the holding of the latter in its adjusted position. When the piston-rod begins its movements in either direction, the valve is held in place principally by the weight of the lever P, bearing against one of the stops on the links Q; but so soon as the roller $u$ makes contact with the fork $s$ the lever begins to rise and its pressure upon the valve mechanism is removed for the time being. The links R being oppositely inclined and connected at their upper ends by links Q, the preponderance of weight is thrown upon the side last struck by the lever P, for, as will be observed, when the lever P is thrown to the right the left-hand link assumes a more nearly vertical position while the right-hand link stands considerably inclined; hence the weight of the links Q, as well as of the right-hand links R, tends to hold the valve to the right, and the same action takes place, only in the opposite direction, when the position of the links is reversed by the fall of the lever P. In the present instance the secondary motor is shown applied to a pump such as is adapted for use in raising water from mines, &c. Intermediate the cylinders $d^2$ $d^3$ is arranged the pump-cylinder L, the inner ends of said cylinders $d^2$ $d^3$ being received and secured in the heads $I^2$ $I^3$, attached to the opposite ends of cylinder L. The piston-rod E extends through the cylinder L, and is provided with a suitable piston, $j^2$, working therein.

Beneath or to one side of the cylinder L is arranged the valve box or chamber K, connected at either end to the heads $I^2$ $I^3$ by the pipes or couplings $l$ $l'$ $l^2$ $l^3$. The valve-box K is divided longitudinally into the inlet-chamber $k$ and the outlet-chamber $k'$. The outlet-chamber $k'$, communicating with the discharge-pipe $F^2$, is provided with inwardly-opening face-valves $o^2$ $o^3$, covering the ends of pipes $l^2$ $l^3$, while the inlet-chamber $k$, communicating with the supply-pipe, is provided with face-valves $o$ $o'$, opening toward pipes $l$ $l'$ and closing against partitions $m$, forming seats therefor.

As will be readily understood, valves $o$ $o^2$ control the admission and expulsion of the liquid on one side of the piston, and valves $o'$ $o^3$ on the other. The liquid, after passing through the secondary motor, may be delivered to the primary motor A by a return-pipe, F', Fig. 3, or it may be delivered into the discharge-pipe $F^2$ of the pump through a connection, $F^3$; and the primary motor A may receive its supply of liquid from the discharge-pipe, as shown in Figs. 4 and 5, or, if desired, it may be supplied from a separate receptacle or reservoir. If the water or other liquid to be raised by the pump is sufficiently free from impurities to permit its use in the primary and secondary motors without injury to the working parts thereof, it is economical to deliver the liquid into the discharge-pipe, thereby dispensing with an extra line of pipe; but if from the nature or condition of the fluid to be raised it cannot well be employed to work the motor, the only change necessary is the laying of a second pipe, forming a return-circuit for the motors.

It will be observed that the liquid delivered by the primary motor, and through the medium of which power is transmitted and communicated to the secondary motor, moves continuously in one direction, and is applied to the secondary motor alternately on either side of the piston; hence no fixed relation is necessary between the two motors, a larger or smaller prime motor being applied to work the secondary motor at will, depending upon the speed and power to be developed.

I claim as my invention—

1. In combination with the double-acting force-pump A, its induction and eduction pipes, the secondary motor, its double-acting piston, and the pump connected thereto, the slide-valve $e^4$, its actuating mechanism, and the air-chamber located above the slide-valve and communicating with the induction-pipe of the secondary motor, substantially as described.

2. In a hydraulic motor, and in combination with its cylinders, piston-rod, and pistons, the valve controlling the inlet and outlet ports, the pivoted shifting lever with its weight and fork, the pivoted links carrying the connecting links and stops, the valve-rod connected to the links, and the shifting rod connected to the piston-rod and carrying a roller for engaging the forks on the shifting lever, substantially as described.

3. In combination with the slide-valve, its rod, and the block $v^9$, adjustably secured to the said rod, the link T, pivoted links R, connecting-links Q, carrying stops $v$ at either end, the lever P, provided with the adjustable weight at one end and the fork $s$ at the other, and adapted to vibrate between links Q and make contact with the stops $v$, and the sliding rod carrying roller $u$, for engaging fork $s$, substantially as described.

NELSON J. TUBBS.

Witnesses:
THOMAS J. BEWLEY,
STEPHEN USTICK.